(12) United States Patent
Murayama et al.

(10) Patent No.: US 11,444,905 B1
(45) Date of Patent: Sep. 13, 2022

(54) PREDICTING RECIPIENT COMMUNICATION PATTERNS AND AVAILABILITY

(71) Applicant: International Business Machines Corporation, Armonk, NY (US)

(72) Inventors: Tomoko Murayama, Yokohama (JP); Takuya Ishikawa, Tokyo (JP); Yuji Sugiyama, Minato-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/354,227

(22) Filed: Jun. 22, 2021

(51) Int. Cl.
*H04L 51/222* (2022.01)

(52) U.S. Cl.
CPC .................. *H04L 51/222* (2022.05)

(58) Field of Classification Search
CPC .................. H04L 51/222
See application file for complete search history.

(56) References Cited

U.S. PATENT DOCUMENTS

| | | | |
|---|---|---|---|
| 7,409,423 B2 * | 8/2008 | Horvitz | G06Q 10/109 709/204 |
| 7,506,333 B1 * | 3/2009 | Belinsky | G06Q 10/109 717/168 |
| 7,774,416 B2 * | 8/2010 | Callanan | G06Q 10/107 709/224 |
| 8,862,519 B2 * | 10/2014 | O'Sullivan | G06Q 10/10 706/11 |
| 9,282,073 B1 * | 3/2016 | Avital | H04L 51/226 |
| 10,585,724 B2 | 3/2020 | Patton | |
| 10,749,833 B2 | 8/2020 | Vendrow | |
| 2010/0017484 A1 * | 1/2010 | Accapadi | G06Q 10/107 709/206 |
| 2010/0121925 A1 * | 5/2010 | Champlin-Scharff | G06Q 10/107 709/206 |
| 2010/0250682 A1 * | 9/2010 | Goldberg | H04L 51/234 709/206 |
| 2011/0219089 A1 | 9/2011 | Robertson | |
| 2012/0173632 A1 * | 7/2012 | Chakra | G06Q 10/107 709/206 |
| 2013/0007153 A1 * | 1/2013 | Maynard | G06Q 10/107 709/206 |
| 2015/0381552 A1 * | 12/2015 | Vijay | H04L 67/306 709/206 |
| 2016/0157064 A1 | 6/2016 | Gårdman | |

(Continued)

*Primary Examiner* — Austin J Moreau
(74) *Attorney, Agent, or Firm* — Aaron N. Pontikos

(57) ABSTRACT

A tool for predicting communication patterns and availability on one or more computer devices. The tool allocates an incoming mail identification to the incoming mail. The tool determines a location of origin for the incoming mail based, at least in part, on domain information and information from an address book. The tool determines one or more holidays, a day of a week, and a time of day utilizing a sending timestamp from the location of origin. The tool determines a sending tendency for the sender identification. The tool determines a response prediction rate for a per-determined timeframe based, at least in part, on the one or more holidays, the day of the week, the time of day and the sending tendency for the sender identification. The tool displays the response prediction rate and the sending tendency in one or more pop-up dialog windows.

20 Claims, 5 Drawing Sheets

(56) References Cited

U.S. PATENT DOCUMENTS

| | | |
|---|---|---|
| 2020/0007485 A1 | 1/2020 | Dyor |
| 2020/0059447 A1 | 2/2020 | Bahar |
| 2020/0107152 A1 | 4/2020 | Dotan-Cohen |
| 2020/0213405 A1* | 7/2020 | Goenka ................ H04L 51/214 |
| 2020/0236082 A1 | 7/2020 | Hyman |
| 2020/0387819 A1* | 12/2020 | Rogynskyy ............ G06N 20/00 |

* cited by examiner

US 11,444,905 B1

PREDICTING RECIPIENT COMMUNICATION PATTERNS AND AVAILABILITY

BACKGROUND OF THE INVENTION

The present invention relates generally to computing device functionality, and more particularly to electronic communications.

Electronic mail is a method of exchanging electronic messages between people utilizing electronic devices. Electronic mail operates across various computer networks, where servers accept, forward, deliver, and store the electronic messages.

SUMMARY

Aspects of an embodiment of the present invention disclose a method, computer program product, and computer system for predicting recipient communication patterns and availability. Responsive to a determination that an incoming mail is not an automatic response, the method includes allocating, by one or more computer processors, an incoming mail identification to the incoming mail. The method includes determining, by the one or more computer processors, a location of origin for the incoming mail based, at least in part, on domain information and information from an address book, wherein the address book includes an address, an incoming mail timestamp, a sender identification, and the incoming mail identification. The method includes determining, by the one or more computer processors, one or more holidays, a day of a week, and a time of day utilizing a sending timestamp from the location of origin. The method includes determining, by the one or more computer processors, a sending tendency for the sender identification based, at least in part, on a frequency of sending activities on the one or more holidays, the day of the week, and the time of day. The method includes determining, by the one or more computer processors, a response prediction rate for a predetermined timeframe based, at least in part, on the one or more holidays, the day of the week, the time of day and the sending tendency for the sender identification. The method includes displaying, by the one or more computer processors, the response prediction rate and the sending tendency in one or more pop-up dialog windows.

DETAILED DESCRIPTION

Embodiments of the present invention recognize that conventional electronic communication (e.g., email, text message, instant messages, etc.) platforms fail to inform a user of holidays and customs of recipients based on their location throughout the world. Embodiments of the present invention further recognize that, although a calendar application function may be used to display holidays, such countermeasures have questionable impact where a sender is not aware of a potential holiday. Embodiments of the present invention further recognize that, even where an automatic notification is returned in response to sending an electronic communication, the automatic notification is received after the electronic communication was sent and offers little assistance in, for example, rescheduling a meeting or anticipating when a recipient may respond to the electronic communication.

Embodiments of the present invention provide the capability to automatically indicate holiday information for a recipient and sender prior to sending an electronic communication. Embodiments of the present invention further provide the capability to identify a country for a recipient when the recipient is entered into a destination field in an electronic communication application and displays one or more holidays and a prediction for recipient communication patterns. Embodiments of the present invention further provide the capability to search an electronic communication for a date and notify a user of any potential holiday conflicts. Embodiments of the present invention further provide the capability to gather domain information by country and a holiday calendar for a country. Embodiments of the present invention further provide the capability to determine communication action patterns for recipients and senders by analyzing past electronic communication tendencies relative to one or more holidays, days of the week, and a time of day. Embodiments of the present invention further provide the capability to, prior to sending an electronic communication, automatically notify a user of holidays observed in a country of a recipient within a certain period of time from the current date and time. Embodiments of the present invention further provide the capability to store data of incoming electronic communications to learn individual sending patterns for recipients and senders based on prior sending activities. Embodiments of the present invention further provide the capability to provide recommendations and alerts where a predicted response time is below a tolerable threshold, which thereby avoids potential issues arising from strict deadlines and time commitments.

Implementation of such embodiments may take a variety of forms, and exemplary implementation details are discussed subsequently with reference to the Figures.

Figure 1:
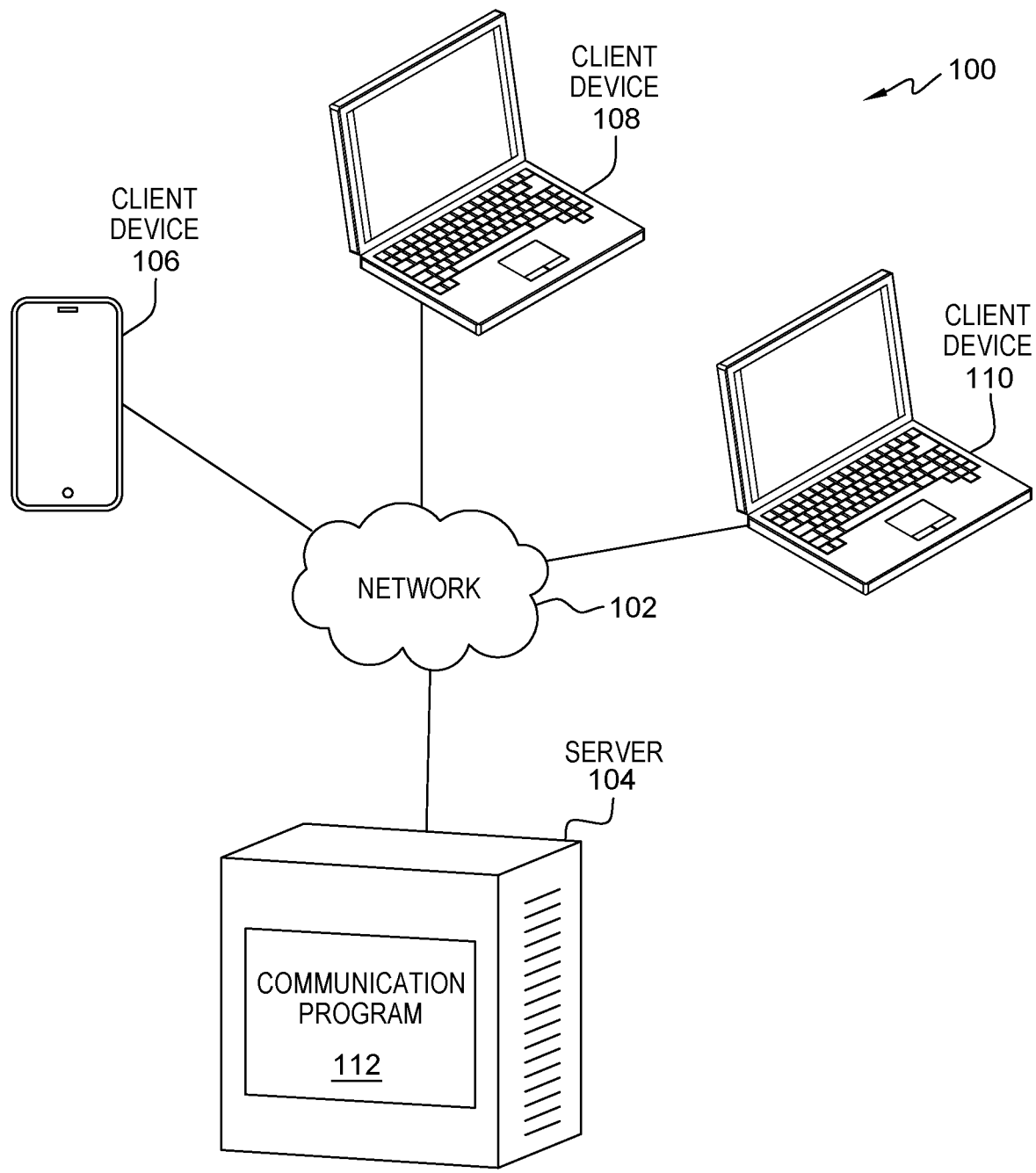
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for predicting recipient communication patterns and availability, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, which includes communication program 112, and one or more client devices, such as client device 106, client device 108, and client device 110.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and communication program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, client device 110, and communication program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 includes communication program 112 for predicting recipient communication patterns and availability on a client device, such as illustrated by client device 106, client device 108, and client device 110, respectively.

In one embodiment, communication program 112 operates on a central server, such as server 104, and can be utilized by one or more client devices, such as client device 106, client device 108, and client device 110, via an application download from the central server or a third-party application store and executed on the one or more client devices. In another embodiment, communication program 112 may be software, downloaded from a central server, such as server 104, and installed on one or more client devices, such as client device 106, client device 108, and client device 110. In yet another embodiment, communication program 112 may be utilized as a software service provided by a third-party cloud service provider (not shown). In yet another embodiment, communication program 112 may include one or more fully integrated components (not shown), such as add-ons, plug-ins, and agent programs, etc., or one or more components installed on one or more client devices, such as client device 106, client device 108, and client device 110, for predicting recipient communication patterns and availability. In one embodiment, communication program 112 can be an add-on feature to a computer program (e.g., electronic mail program, electronic mail management tool, communication program, web browser, social media application, video conferencing program, and text messaging program, etc.) that provides a user the ability to predict recipient communication patterns and availability. In one embodiment, communication program 112 can be fully integrated, partially integrated, or separate from a third-party service (e.g., electronic mail service, electronic communication service, etc.). In one embodiment, communication program 112 may be an application, downloaded from an application store or third-party provider, capable of being used in conjunction with a computer program during interactions between one or more authorized users utilizing a plurality of user devices, such as client device 106, client device 108, and client device 110, to predict recipient communication patterns and availability.

In one embodiment, communication program 112 can be utilized by one or more user devices, such as client device 106, client device 108, and client device 110, to predict recipient availability and recipient communication patterns. In one embodiment, communication program 112, when integrated into an electronic mail (email) application, provides the capability to automatically predict recipient availability based, at least in part, on current and upcoming holidays observed in a geographic location of a recipient (e.g., country, region, etc.). In one embodiment, communication program 112 provides the capability to identify a location or country of a recipient when the recipient is entered into a destination field of an email and display in a pop-up window any current and upcoming holidays observed in the country of the recipient. In one embodiment, communication program 112 provides the capability to customize recipient email addresses to correspond to a respective location or country. In one embodiment, communication program 112 provides the capability to analyze recipient communication action patterns (e.g., sending, replying, forwarding, deleting, ignoring, etc.). In one embodiment, communication program 112 provides the capability to gather individual recipient communication action pattern data, such as a time period between receipt of a communication and an associated action (e.g., reply, read, delete, forward, etc.) and based, at least in part, on the communication action pattern data, predict a probability of receiving a response from the recipient in a given time period. In one embodiment, communication program 112 provides the capability to quantify a likelihood of a recipient communication action on any given day, such as on a weekend, during a weekday, and on a holiday, etc., based, at least in part, on historical recipient communication action data. In one embodiment, communication program 112 provides the capability to recommend an alternative proposal for contacting a recipient based, at least in part, on a predicted probability of a recipient not responding in a given time period.

In one embodiment, communication program 112 may be configured to access various data sources, such as a database or repository (not shown), that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In one embodiment, communication program 112 enables the authorized and secure processing of personal data. In one embodiment, where the data analyzed extends to personal data requiring consent, communication program 112 provides a mechanism related to consent. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, communication program 112 provides information regarding personal data and the nature (e.g., type, scope, purpose, duration, etc.) of the processing. In one embodiment, communication program 112 provides a user with copies of stored personal data. In one embodiment, communication program 112 allows the correction or completion of incorrect or incomplete personal data. In one embodiment, communication program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize an electronic mail program, one or more software applications, and one or more input/output devices (e.g., camera, microphone, speakers, etc.). In another example, client device 108 and client device 110 may be a user device authorized for access by one or more additional users. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user with the capability to interact with communication program 112, and one or more authorized users via a computer device, such as client device 108 and client device 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106, client device 108, and client device 110 may be any wearable electronic devices, including, but not limited to, wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer capable of supporting an electronic communication application for sending and receiving electronic communications (e.g., email, text, video, etc.). In one embodiment, client device 106, client device 108, and client device 110 may include one or more sensors including, but not limited to, heart rate monitors, blood oxygen saturation sensors, sleep sensors, accelerometers, motion sensors, thermal sensors, radio frequency identification (RFID) sensors, cameras, microphones, etc. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

Figure 2:
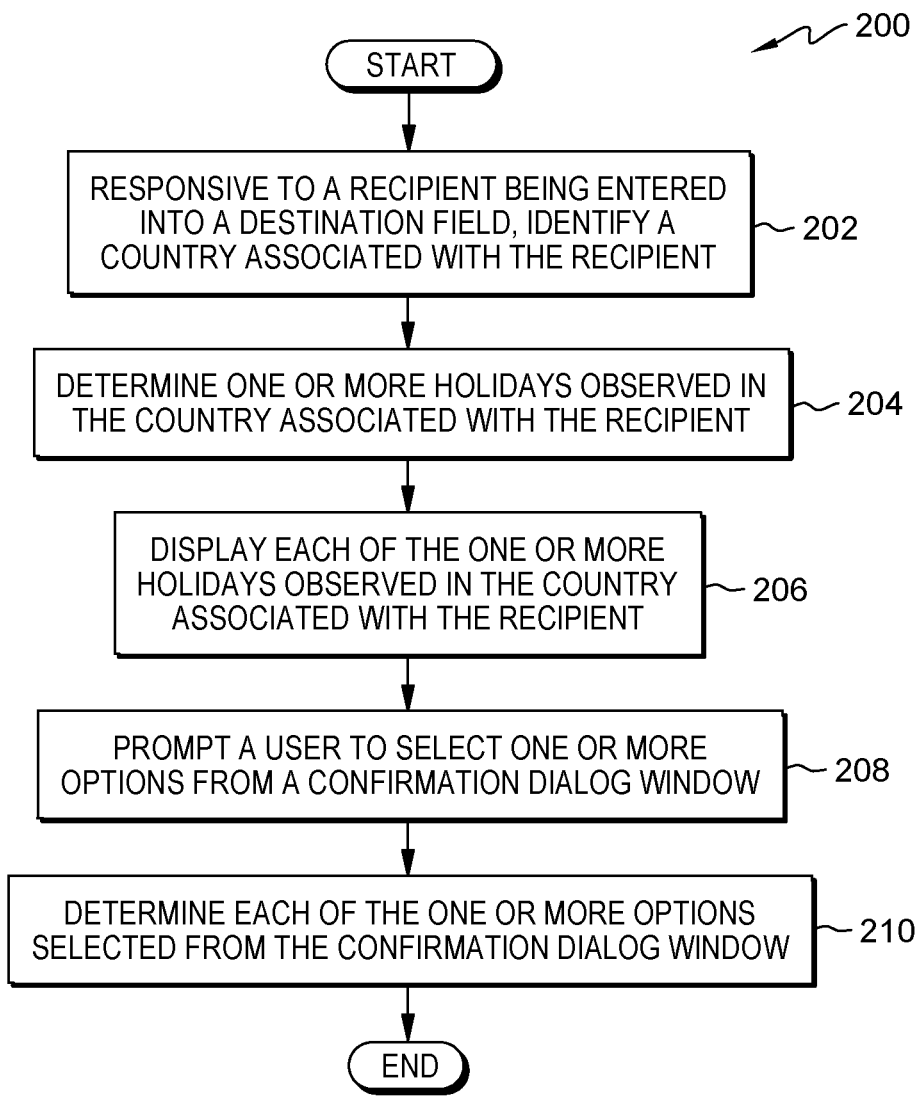
FIG. 2 is a flowchart depicting operational steps of a communication program, such as the communication program of FIG. 1, generally designated 200, for predicting recipient availability, in accordance with an embodiment of the present invention.

FIG. 2 is a flowchart depicting operational steps of a communication program, such as communication program 112, generally designated 200, for predicting recipient availability, in accordance with an embodiment of the present invention. Although FIG. 2 depicts operational steps of a communication program for predicting recipient availability utilizing email communication as an example, embodiments of the present invention may be similarly practiced for predicting recipient availability utilizing short message service (SMS) communication, such as text messaging on a mobile device, and video streaming communication, such as video conferencing on a computing device.

Responsive to a recipient being entered into a destination field, communication program 112 identifies at least one location and a country associated with the recipient (202). In one embodiment, communication program 112 identifies a location or country associated with the recipient by collating addresses, an address book, and domain information by location or country. In one embodiment, communication program 112 may utilize an address book collation module to access a user address book containing information pertaining to a plurality of contacts, such as a personal ID represented by a unique numeric value automatically generated upon receipt of an electronic communication, or upon an address being added into a destination field during creation of an electronic communication. In some embodiments, the address book may include data such as a mail address recorded automatically when added to an electronic communication, a personal name associated with each personal ID, a default location or country presumed from domain information, and a deletion flag.

Communication program 112 determines one or more holidays observed in the location or country associated with the recipient (204). In one embodiment, communication program 112 determines the one or more holidays observed in the location or country associated with the recipient by converting a time difference between a time zone for the recipient and a time zone for a sender utilizing a current date and time in a region of the recipient and a current date and time in a region of the sender. In one embodiment, communication program 112 collates holiday information by country utilizing a holiday collation module to access holiday information for a location or country during a pre-determined timeframe (e.g., a week, a month, etc.). In one embodiment, communication program 112 generates a list of holidays observed in the location or country of the recipient during the pre-determined timeframe.

Communication program 112 displays each of the one or more holidays observed in the location or country associated with the user (206). In one embodiment, communication program 112 displays each of the one or more holidays observed in the location or country associated with the recipient to a sender in a pop-up dialog window when a curser is hovered over the address of the recipient in a destination field as the sender is creating the electronic communication. In one embodiment, communication program 112 may display a list including data in a pop-up dialog window, or multiple pop-up dialog windows.

Communication program 112 prompts a user to select one or more options from a confirmation dialog window (208). In one embodiment, responsive to the user selecting an electronic communication send function button to proceed with processing the electronic communication, communication program 112 prompts the user (i.e., the sender) to select one or more options from a confirmation dialog window, where the one or more options include collate any date and time data found within a text body of the electronic communication with a holiday list for the location or country associated with the recipient, register a recipient, having no associated location or country data from the domain information, with manually entered country information, and filter holiday notifications as necessary and unnecessary for recipients residing in a similar region to the sender. In one embodiment, the confirmation dialog window may include a clickable "continue" and "cancel" function button to proceed with further steps.

Communication program 112 performs each of the one or more options selected from the configuration dialog window (210).

Figure 3:
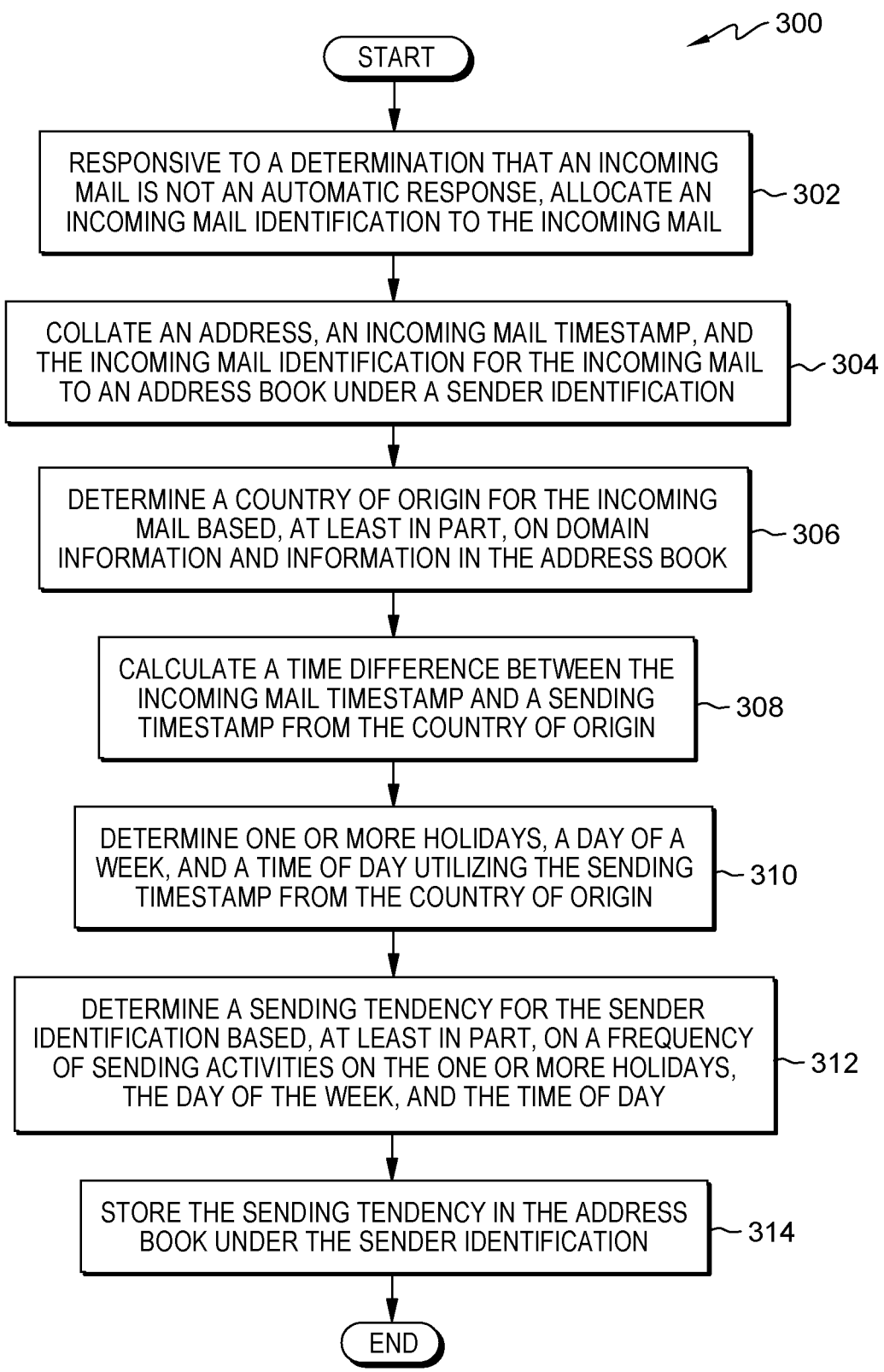
FIG. 3 is a flowchart depicting operational steps of a communication program, such as the communication program of FIG. 1, generally designated 300, for predicting recipient communication patterns, in accordance with an embodiment of the present invention.

FIG. 3 is a flowchart depicting operational steps of a communication program, such as communication program 112, generally designated 300, for predicting recipient communication patterns, in accordance with an embodiment of the present invention. Although FIG. 3 depicts operational steps of a communication program for predicting recipient communication patterns utilizing email communication, embodiments of the present invention may be similarly practiced for predicting recipient communication patterns utilizing short message service (SMS) communication, such as text messaging on a mobile device, and video streaming communication, such as video conferencing on a computing device.

Responsive to a determination that an incoming mail is not an automatic response, communication program 112 allocates an incoming mail identification to the incoming mail (302). In one embodiment, an incoming mail may include, but is not limited to, an electronic mail (i.e., email), a short message service (SMS) text message, an instant message, or any other electronic message or response capable of being transmitted between two or more client devices, such as client device 106, client device 108, and client device 110. In one embodiment, the incoming mail identification is a unique identifier assigned to the incoming mail.

Communication program 112 collates an address, an incoming mail timestamp, and the incoming mail identification for the incoming mail to an address book under a sender identification (304). In one embodiment, communication program 112 stores the address, the incoming mail timestamp, and the incoming mail identification for the incoming mail to an address book under a sender identification.

Communication program 112 determines a location of origin for the incoming mail based, at least in part, on domain information and information from the address book (306).

Communication program 112 calculates a time difference between the incoming mail timestamp and a sending timestamp from the location or location of origin (308).

Communication program 112 determines one or more holidays, a day of a week, and a time of day utilizing the sending timestamp from the location or location of origin (310).

Communication program 112 determines a sending tendency for the sender identification based, at least in part, on a frequency of sending activities on the one or more holidays, the day of the week, and the time of day (312). In one embodiment, communication program 112 determines a sending tendency for the sender identification by referencing incoming mail history data from an incoming mail history database. In one embodiment, communication program 112 references incoming mail history data to determine sending activities between two contacts. In one embodiment, communication program 112 calculates the probability of receiving a response to an electronic communication when sending to a specific contact relative to a day of a week, a time of a day, and a holiday utilizing past electronic communication history indicated by the incoming mail history data from the incoming mail history database.

For example, the sending tendency may be expressed as a function of "$A/(A+B+C)$, $B/(A+B+C)$, and $C/(A+B+C)$", where "A" is equal to a number of electronic communications that arrived on holidays (i.e., both sender and recipient holidays) within one calendar year divided by a number of holidays within the last calendar year, "B" is equal to a number of electronic communications that arrived on weekends within one calendar year divided by a number of weekends within the last calendar year, and "C" is equal to a number of electronic communications that arrived on weekdays within one calendar year divided by the number of weekdays in the last calendar year.

Communication program 112 stores the sending tendency in the address book under the sender identification (314).

Figure 4:
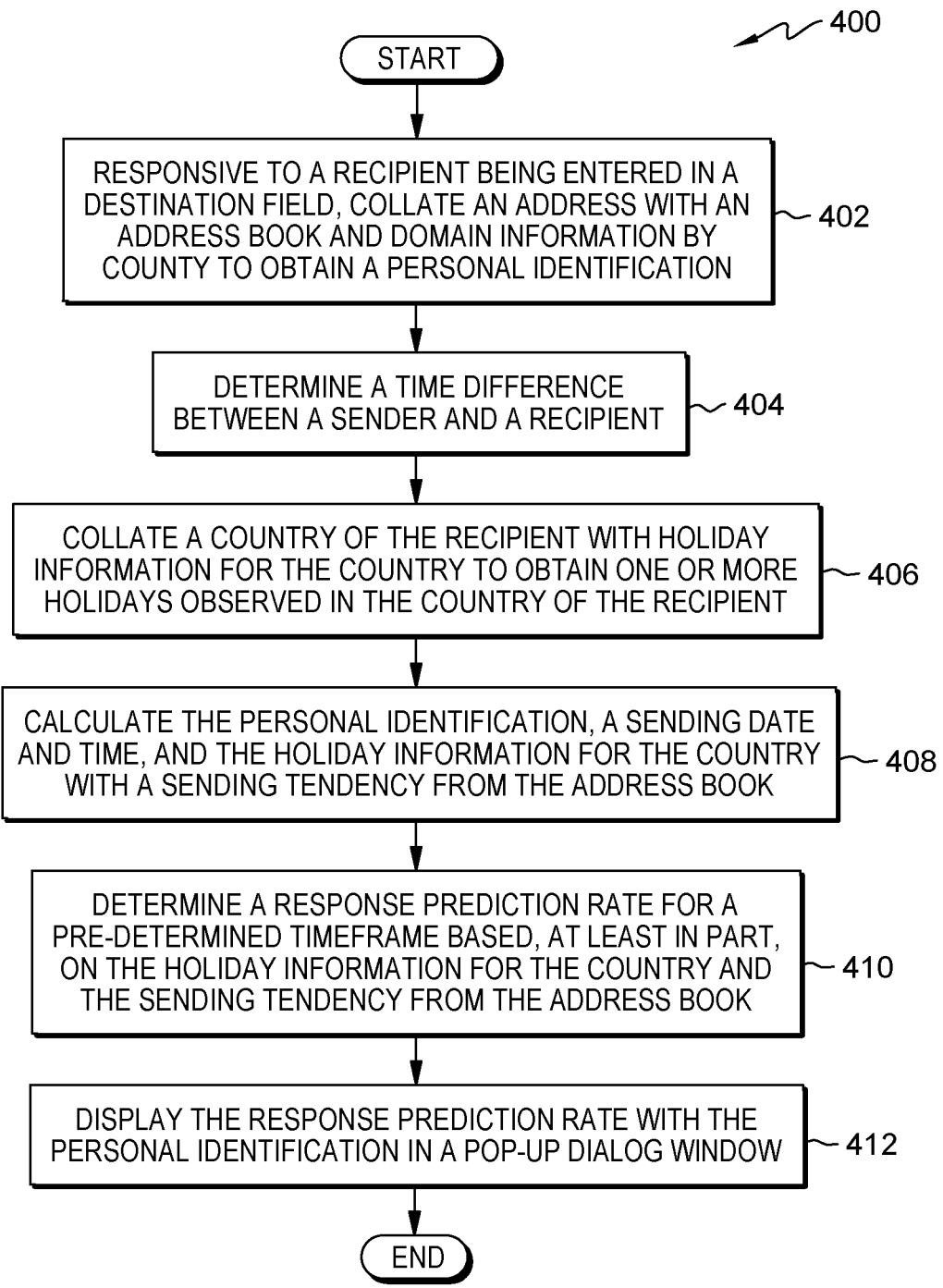
FIG. 4 is a flowchart depicting operational steps of a communication program, such as the communication program of FIG. 1, generally designated 400, for notification of recipient communication patterns, in accordance with an embodiment of the present invention.

FIG. 4 is a flowchart depicting operational steps of a communication program, such as communication program 112, generally designated 400, for notification of recipient communication patterns, in accordance with an embodiment of the present invention. Although FIG. 4 depicts operational steps of a communication program for notification of recipient communication patterns utilizing email communication, embodiments of the present invention may be similarly practiced for predicting recipient communication patterns utilizing short message service (SMS) communication, such as text messaging on a mobile device, and video streaming communication, such as video conferencing on a computing device.

Responsive to a recipient being entered into a destination field, communication program 112 collates an address with an address book and domain information by location or country to obtain a personal identification (402).

Communication program 112 determines a time difference between a sender and a recipient (404).

Communication program 112 collates a country of the recipient with holiday information for the country to obtain one or more holidays observed in the location or country of the recipient (406).

Communication program 112 collates the personal identification, a sending date and time, and the holiday information for the location or country with a sending tendency from the address book (408).

Communication program 112 determines a response prediction rate for a per-determined timeframe based, at least in part, on the holiday information for the location or country and the sending tendency (410).

Communication program 112 displays the response prediction rate with the personal identification in a pop-up dialog window (412). In one embodiment, responsive to an electronic communication send function button is selected, communication program 112 may display the response prediction rate with the personal identification in a list, where the list includes all recipients and associated response prediction rates for addresses entered in the destination field. In one embodiment, the response prediction rate may be a percentage indicating a likelihood of receiving a response by as specific date and may also include a projected date indicating when to expect a response. In one embodiment, communication program 112 may display the response prediction rate and the sending tendency for the sender in one or more pop-up dialog windows. In one embodiment, communication program 112 displays the response prediction rate and the sending tendency when a user hovers over the destination field and/or an address for one or more recipients.

For example, when an electronic communication is about to be sent and responsive to a determination that a response prediction rate is below a pre-determined threshold, communication program 112 can indicate the response prediction rate in a pop-up dialog window and generate one or more actions (e.g., rescheduling a meeting, sending the electronic communication at a later date and time, etc.) to take to increase the likelihood of a response. In this example, communication program 112 may set the pre-determined threshold in advance to determine a probability of not receiving a response, and when a recipient address is entered into a destination field, communication program 112 may recommend at that time to send the electronic communication that will increase the likelihood of receiving a response. In this example, communication program 112 may direct a user to a GUI that will assist in rescheduling the electronic communication.

Figure 5:
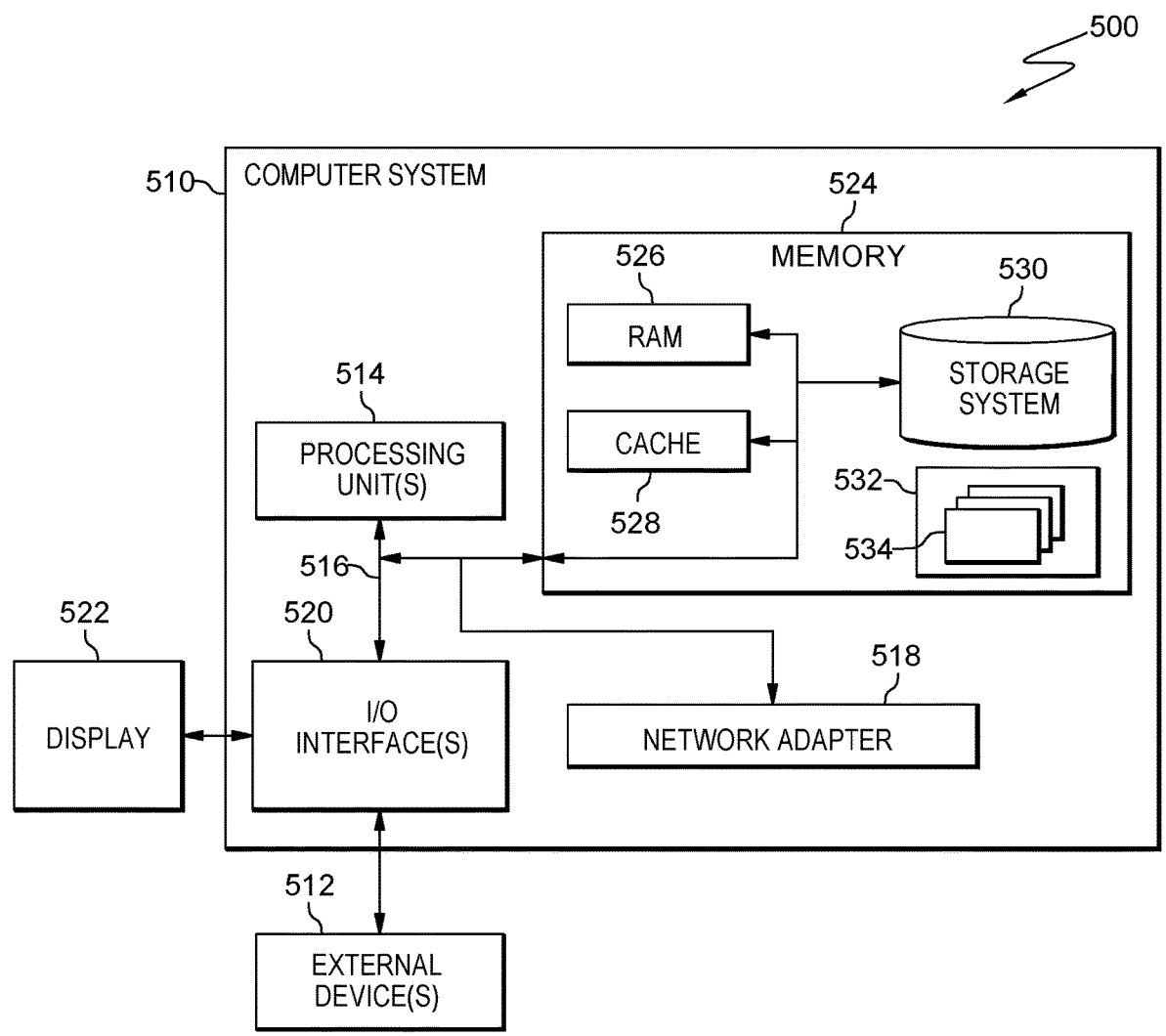
FIG. 5 is a block diagram depicting components of a data processing environment, such as the server of FIG. 1, generally designated 500, in accordance with an embodiment of the present invention.

FIG. 5 is a block diagram depicting components of a data processing environment, such as server 104 of data processing environment 100, generally designated 500, in accordance with an embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 510. The components of computer system 510 may include, but are not limited to, one or more processors or processing unit(s) 514, memory 524 and bus 516 that couples various system components including memory 524 to processing unit(s) 514.

Bus 516 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 510 typically includes a variety of computer system readable media. Such media may be any available media that is accessible by computer system 510 and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example and not limitation, as well as an operating system, one or more application programs, other program modules and program data. Each of the operating systems, one or more application programs, other program modules and program data or some combination thereof, may include an implementation of a networking environment. Program modules 534 generally carry out the functions and/or methodologies of embodiments of the invention as described herein. Computer system 510 may also communicate with one or more external device(s) 512, such as a keyboard, a pointing device, a display 522, etc. or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks, such as a local area network (LAN), a general wide area network (WAN) and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives and data archival storage systems may be used in conjunction with computer system 510.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for predicting communication patterns and availability, the method comprising:
   responsive to a determination that an incoming mail is not an automatic response, allocating, by one or more computer processors, an incoming mail identification to the incoming mail;
   determining, by the one or more computer processors, a location of origin for the incoming mail based, at least in part, on domain information and information from an address book, wherein the address book includes an address, an incoming mail timestamp, a sender identification, and the incoming mail identification;
   determining, by the one or more computer processors, one or more holidays, a day of a week, and a time of day utilizing a sending timestamp from the location of origin;
   determining, by the one or more computer processors, a sending tendency for the sender identification based, at least in part, on a frequency of sending activities on the one or more holidays, the day of the week, and the time of day;
   determining, by the one or more computer processors, a response prediction rate for a per-determined timeframe based, at least in part, on the one or more holidays, the day of the week, the time of day and the sending tendency for the sender identification; and
   displaying, by the one or more computer processors, the response prediction rate and the sending tendency in one or more pop-up dialog windows.

2. The method of claim 1, further comprising:
   responsive to a recipient being entered into a destination field, identifying, by the one or more computer processors, a country associated with the recipient, wherein identifying the country associated with the recipient includes collating a plurality of addresses, the address book, and the domain information by country.

3. The method of claim 1, further comprising:
   determining, by the one or more computer processors, one or more holidays that are observed in a country associated with a recipient, wherein determining the one or more holidays includes converting a time difference between a time zone for the recipient and a time zone for a sender utilizing a date and time in a region of the recipient and a date and time in a region of the sender.

4. The method of claim 1, further comprising:
   displaying, by the one or more computer processors, each of one or more holidays observed in a country associated with a recipient in a pop-up dialog window when a curser is hovered over an address of the recipient in a destination field; and
   prompting, by the one or more computer processors, a user to select one or more options from a confirmation dialog window.

5. The method of claim 1, wherein determining the sending tendency for the sender identification further comprises:
   referencing, by the one or more computer processors, incoming mail history data from an incoming mail history database; and
   calculating, by the one or more computer processors, based, at least in part, on the incoming mail history data, a probability of receiving a response to an electronic communication when sending to a specific contact relative to the one or more holidays, the day of the week, and the time of day.

6. The method of claim 1, wherein determining the response prediction rate for the per-determined timeframe further comprises:
   responsive to a determination that a response prediction rate is below a pre-determined threshold, indicating, by the one or more computer processors, the response prediction rate in a pop-up dialog window; and
   generating, by the one or more computer processors, one or more actions to take to increase a likelihood of a response.

7. The method of claim 6, wherein the one or more actions include rescheduling a meeting and sending an electronic communication at a later date and time.

8. A computer program product for predicting communication patterns and availability, the computer program product comprising:
   one or more computer readable storage media and program instructions stored on the one or more computer readable storage media, the stored program instructions comprising:
      program instructions to, responsive to a determination that an incoming mail is not an automatic response, allocate an incoming mail identification to the incoming mail;
      program instructions to determine a location of origin for the incoming mail based, at least in part, on domain information and information from an address book, wherein the address book includes an address, an incoming mail timestamp, a sender identification, and the incoming mail identification;
      program instructions to determine one or more holidays, a day of a week, and a time of day utilizing a sending timestamp from the location of origin;
      program instructions to determine a sending tendency for the sender identification based, at least in part, on a frequency of sending activities on the one or more holidays, the day of the week, and the time of day;
      program instructions to determine a response prediction rate for a per-determined timeframe based, at least in part, on the one or more holidays, the day of the week, the time of day and the sending tendency for the sender identification; and
      program instructions to display the response prediction rate and the sending tendency in one or more pop-up dialog windows.

9. The computer program product of claim 8, further comprising:
   program instructions to, responsive to a recipient being entered into a destination field, identify a country associated with the recipient, wherein identifying the country associated with the recipient includes collating a plurality of addresses, the address book, and the domain information by country.

10. The computer program product of claim 8, further comprising:
    program instructions to determine one or more holidays that are observed in a country associated with a recipient, wherein determining the one or more holidays includes converting a time difference between a time zone for the recipient and a time zone for a sender utilizing a date and time in a region of the recipient and a date and time in a region of the sender.

11. The computer program product of claim 8, further comprising:
    program instructions to display each of one or more holidays observed in a country associated with a recipient in a pop-up dialog window when a curser is hovered over an address of the recipient in a destination field; and program instructions to prompt a user to select one or more options from a confirmation dialog window.

12. The computer program product of claim 8, wherein program instructions to determine the sending tendency for the sender identification further comprise:

program instructions to reference incoming mail history data from an incoming mail history database; and program instructions to calculate based, at least in part, on the incoming mail history data, a probability of receiving a response to an electronic communication when sending to a specific contact relative to the one or more holidays, the day of the week, and the time of day.

13. The computer program product of claim 8, wherein program instructions to determine the response prediction rate for the per-determined timeframe further comprise:

program instructions to, responsive to a determination that a response prediction rate is below a pre-determined threshold, indicate the response prediction rate in a pop-up dialog window; and program instructions to generate one or more actions to take to increase a likelihood of a response.

14. The computer program product of claim 13, wherein the one or more actions include rescheduling a meeting and sending an electronic communication at a later date and time.

15. A computer system for predicting communication patterns and availability, the computer system comprising:

one or more computer processors;

one or more computer readable storage media; and program instructions stored on at least one of the one or more computer readable storage media for execution by at least one of the one or more computer processors, the stored program instructions comprising:

program instructions to, responsive to a determination that an incoming mail is not an automatic response, allocate an incoming mail identification to the incoming mail;

program instructions to determine a location of origin for the incoming mail based, at least in part, on domain information and information from an address book, wherein the address book includes an address, an incoming mail timestamp, a sender identification, and the incoming mail identification;

program instructions to determine one or more holidays, a day of a week, and a time of day utilizing a sending timestamp from the location of origin;

program instructions to determine a sending tendency for the sender identification based, at least in part, on a frequency of sending activities on the one or more holidays, the day of the week, and the time of day;

program instructions to determine a response prediction rate for a per-determined timeframe based, at least in part, on the one or more holidays, the day of the week, the time of day and the sending tendency for the sender identification; and program instructions to display the response prediction rate and the sending tendency in one or more pop-up dialog windows.

16. The computer system of claim 15, further comprising:

program instructions to, responsive to a recipient being entered into a destination field, identify a country associated with the recipient, wherein identifying the country associated with the recipient includes collating a plurality of addresses, the address book, and the domain information by country.

17. The computer system of claim 15, further comprising:

program instructions to determine one or more holidays that are observed in a country associated with a recipient, wherein determining the one or more holidays includes converting a time difference between a time zone for the recipient and a time zone for a sender utilizing a date and time in a region of the recipient and a date and time in a region of the sender.

18. The computer system of claim 15, further comprising:

program instructions to display each of one or more holidays observed in a country associated with a recipient in a pop-up dialog window when a curser is hovered over an address of the recipient in a destination field; and program instructions to prompt a user to select one or more options from a confirmation dialog window.

19. The computer system of claim 15, wherein program instructions to determine the sending tendency for the sender identification further comprise:

program instructions to reference incoming mail history data from an incoming mail history database; and program instructions to calculate based, at least in part, on the incoming mail history data, a probability of receiving a response to an electronic communication when sending to a specific contact relative to the one or more holidays, the day of the week, and the time of day.

20. The computer system of claim 15, wherein program instructions to determine the response prediction rate for the per-determined timeframe further comprise:

program instructions to, responsive to a determination that a response prediction rate is below a pre-determined threshold, indicate the response prediction rate in a pop-up dialog window; and program instructions to generate one or more actions to take to increase a likelihood of a response.

* * * * *